United States Patent
Talati et al.

[19]

[11] Patent Number: 5,903,878
[45] Date of Patent: May 11, 1999

[54] METHOD AND APPARATUS FOR ELECTRONIC COMMERCE

[76] Inventors: Kirit K. Talati, 207 Sun Ray La., Sunnyvale, Tex. 75102; Yashvant Jani, 4708 Nocana Dr., Plano, Tex. 75024

[21] Appl. No.: 08/915,436

[22] Filed: Aug. 20, 1997

[51] Int. Cl.[6] .................................................. G06F 17/60
[52] U.S. Cl. ............................... 705/26; 705/40; 380/23; 380/24
[58] Field of Search ..................... 705/26, 40; 380/23, 380/24; 395/226, 200.33, 186, 187, 188

[56] References Cited

U.S. PATENT DOCUMENTS

| | | | |
|---|---|---|---|
| 4,264,782 | 4/1981 | Konheim | 380/25 |
| 4,799,156 | 1/1989 | Shavit et al. | 705/25 |
| 5,267,314 | 11/1993 | Stamber | 380/24 |
| 5,319,710 | 6/1994 | Atalla | 380/23 |
| 5,524,073 | 6/1996 | Stamber | 380/24 |
| 5,621,797 | 4/1997 | Rosen | 380/24 |
| 5,646,998 | 7/1997 | Stamber | 380/25 |
| 5,671,279 | 9/1997 | Elgamal | 380/23 |
| 5,710,887 | 1/1998 | Chelliah et al. | 705/26 |
| 5,715,314 | 2/1998 | Payne et al. | 380/24 |
| 5,724,424 | 3/1998 | Giddord | 380/24 |
| 5,790,677 | 8/1998 | Fox et al. | 380/24 |
| 5,793,302 | 8/1998 | Stamber | 340/825.34 |
| 5,794,221 | 8/1998 | Egendorf | 705/40 |
| 5,809,144 | 9/1998 | Sirbu et al. | 380/25 |
| 5,822,737 | 10/1998 | Ogram | 705/26 |
| 5,825,881 | 10/1998 | Colvin, Sr. | 380/24 |
| 5,826,029 | 10/1998 | Gore, Jr. et al. | 395/200.57 |
| 5,850,442 | 12/1998 | Muftic | 380/21 |

*Primary Examiner*—Allen R. MacDonald
*Assistant Examiner*—Romain Jeanty
*Attorney, Agent, or Firm*—Jenkens & Gilchrist, P.C.

[57] ABSTRACT

A method for providing validated electronic commerce transactions is disclosed. A transaction order generated by a purchaser has a unique transaction identifier associated therewith and the purchase order is transmitted to a merchant and then to a transaction administrator. The transaction administrator contacts the original purchaser and provides the generated unique transaction identifier to confirm whether or not the transaction order was initially provided by the purchaser. Upon verification of origination of the transaction order by the purchaser and other transaction information, the transaction administrator notifies the merchant and the transaction may be completed.

52 Claims, 11 Drawing Sheets

| Message ID | Mail Type | To | Subject | Mail Contents |
|---|---|---|---|---|
| Unique Global Transaction ID | 1-Outbox<br>2-Inbox<br>3-SentItem<br>4-Transaction | Recipient Addresses | | Notes and Attachments |
| 331 | 335 | 340 | 345 | 348 |

FIG. 12

METHOD AND APPARATUS FOR ELECTRONIC COMMERCE

BACKGROUND OF THE INVENTION

1. Technical Field of the Invention

The present invention relates to electronic commerce transactions, and more particularly, to a method and apparatus enabling validated electronic commerce transactions between an originator, a recipient and a transaction administrator.

2. Description of Related Art

The increasing use of electronic media, such as the Internet, smart phones, screen phones and television with World Wide Web access, have expanded the opportunities for electronic commerce. In electronic commerce two or more entities electronically process specific tasks related to commerce ranging from purchase and payment to real estate transactions. Financial examples of electronic commerce include purchase and payment transactions. Purchase transactions are performed using credit and debit cards. Payment transactions are performed in paying bills, sending refunds on return merchandise, sending awards, etc.

A common set-up for commercial (including electronic) transactions is illustrated in FIG. 1. The transaction includes processing steps taking place between three entities, namely, a client 10, a merchant 20 and a payment authority (PA) 30. A delivery system between the client 10, merchant 20 and a PA 30 exists so that the steps required for transactions can be performed properly.

FIG. 2 is a flow diagram generally illustrating the steps involved in a commercial transaction. In step 12, the client 10 places a purchase order to the merchant 20. The purchase order will include the item(s) the client desires to purchase and payment information on an account from which to purchase the item. This purchase order may be for goods, services or any other item normally involved in commercial transactions. When a purchase order is received by the merchant 20, the merchant sends at step 13 a request for payment authorization to the payment authority (PA) 30.

Inquiry step 14 determines whether or not the purchase is authorized at the PA 30. This step is performed by the processing equipment 35 associated with the PA 30. The PA 30 responds at step 15 with a confirmation and authorization for the payment amount once the payment information regarding the client 10 checks out. If the payment information is not confirmed with the PA 30, the PA transmits a rejection at step 16 for the requested purchase authorization transaction. Upon confirmation of the transaction, the merchandise is delivered to the client 10 at step 17. Upon rejection of the transaction, the merchant 20 notifies the client 10 of the denial of authorization by CCA 30 at step 18. The sequence of steps 12, 13, 14, 15, 16, 17 and 18 must occur within some type of traceable delivery system.

The delivery system between the client 10 and the merchant 20 can be a regular mail system, telephone system, computer network or any other delivery system like UPS or Federal Express. The delivery system between the client 10 and the merchant 20 must also have some tracking capability. The delivery system between the merchant 20 and the CCA 30 is typically a private network providing Point-Of-Sale (POS) processing. All necessary information is transferred between two or more points in this network with a tracking mechanism that can follow the transactions. All of the above steps can also be executed within electronic commerce transactions.

However, in electronic commerce it is not possible to properly authenticate entities and transactions. In order to properly authenticate entities such as a client 10 and the merchant 20 performing a transaction, there is proposed a standard SET (Secure Electronic Transactions) in which each entity obtains a Certificate of Authentication from a Certificate Authority (CA) whereby clients and merchants can authenticate each other before performing any transaction by digitally signing the contents of the transaction and having the digital signature authenticated by the CA. This open exchange of digital signatures increases the potential of fraud. Thus, there is also a need for secure electronic commerce where the exchange of digital signatures between entities is eliminated.

An unauthorized client can send in a purchase order with an address to which to deliver the goods and no proper tracking can be established to validate whether or not an authorized client has initiated the purchase order. The PA 30 cannot establish whether the request from merchant 20 is initiated by the true client 10 or an unauthorized client. It is possible that a purchase order was never actually generated by an authorized client 10 but by someone else at the merchant's place of business. Additionally, the amount of the authorization can be changed or inflated by the merchant 20 and thus become an invalid request. The PA 30 does not know the real amount requested by the authorized client 10 and does not have any mechanism to confirm this information. Finally, the delivery address could be different from the actual address of the client 10, and the true client would not receive the merchandise, just the bill. Furthermore, there is no tracking system for automatically validating electronic transactions. Because of these issues, electronic commerce is a risky proposition.

In today's electronic banking, payment transactions take place by sending payment requests to a bank or third party to create electronic checks. The bank then makes payment to the client's payee or third party then sends the electronic check to the client payee. However, since the client's name, bank A.B.A. number and account number are easily accessible, it is easy for an unknown third party to create fund transfers even though data can be exchanged securely between the client and the bank. Furthermore, electronic check processing still has to be carried out as shown in FIG. 12 where PA 30 is a Banking System. Electronic commerce on the Internet is still a risky business because by federal statute, the bank is liable for this kind of fraudulent transaction. There is therefore a need to provide validated banking transactions over the Internet.

SUMMARY OF THE INVENTION

The present invention overcomes the foregoing and other problems with a method and apparatus enabling verification and validation of original "electronic commerce transactions" between one or more originators, recipients, and transaction administrators (TA). The originator is a party who originates the transaction for exchanging information documents or for initiating a payment via an electronic check or a payment transaction for goods and services from the recipient. The originator is synonymous with "client", "purchaser", "user", "requester" and "account holder". The recipient is the entity receiving the information document or payment for a provided service such as a utility bill or a merchant who provides goods and services. Recipient is synonymous with "merchant", "service provider", "vendor" and "payee". The transaction administrator (TA) is an entity which authenticates entities and validates the content of the transaction by the originator. Transaction administrator is synonymous with "Credit Card Authority (CCA)", "Government Authority", "Financial Network", or "Banking system (BS)".

A validated transaction is a transaction in which the TA validates the entities, facilitates the transaction and/or validates the contents of the transaction by the originator. In a validated electronic commerce transaction, either the client, merchant or transaction administrator can initiate the transaction. In a purchase transaction, the client initiates a transaction requesting particular items of merchandise or services from a merchant via the Internet, a dial-up-network, or any suitable network. The electronic transaction includes details of the transaction such as descriptions of the item(s) that the client desires to purchase, credit card or check payment information, information on other types of payment by means of which the item(s) will be purchased, and a unique transaction identifier that has been generated by the originator and is uniquely associated with the particular purchase transaction.

This information is transmitted to the merchant over the network. In response to the purchase order, the merchant generates a payment authorization request for transmission to the TA. The payment authorization request will have attached to it the unique transaction identifier initially provided by the client along with transaction information. Upon receipt of the payment authorization request the TA will validate the client and the merchant using the information provided. The TA then generates a validation request to the client that includes the unique transaction identifier. This communication between the TA and the client may be encrypted using a suitable encryption method or a set of virtual keys known only to the TA and each individual purchaser.

Upon receipt of the validation request, the client decodes, if necessary, the encrypted validation request and extracts the unique transaction identifier therefrom. The identifier is compared to a listing of generated transaction identifiers at the client to confirm that the client authorized the transaction order with which the transaction identifier is associated. Confirmation or denial of the validation is transmitted back to the TA by the originator. This confirmation may be encrypted using a suitable encryption method, if necessary. To provide additional security, a query or group of queries may be included within the validation requests between the TA and the originator. These queries are randomly generated and directed to information known solely by the originator, such as mother's maiden name, social security number, driver's license number, birth date, etc.

Upon receipt of validation or non-validation from the originator, the TA confirms or aborts the transaction by notifying the recipient whether or not the transaction is valid based upon the originator's validation response and the accuracy of the information contained in the transaction request. If the information in the transaction request checks out, the item(s) ordered may be delivered to the originator by the recipient. The delivery and communication systems between the client, merchant and TA preferably consists of some type of computer network such as the Internet, private Intranet or any suitable network.

BRIEF DESCRIPTION OF THE DRAWINGS

For a more complete understanding of the present invention, reference is made to the following detailed description taken in conjunction with the accompanying drawings wherein:

FIG. 12 is an illustration of an e-mail record stored within an e-mail database;

DETAILED DESCRIPTION OF THE INVENTION

Figure 1:
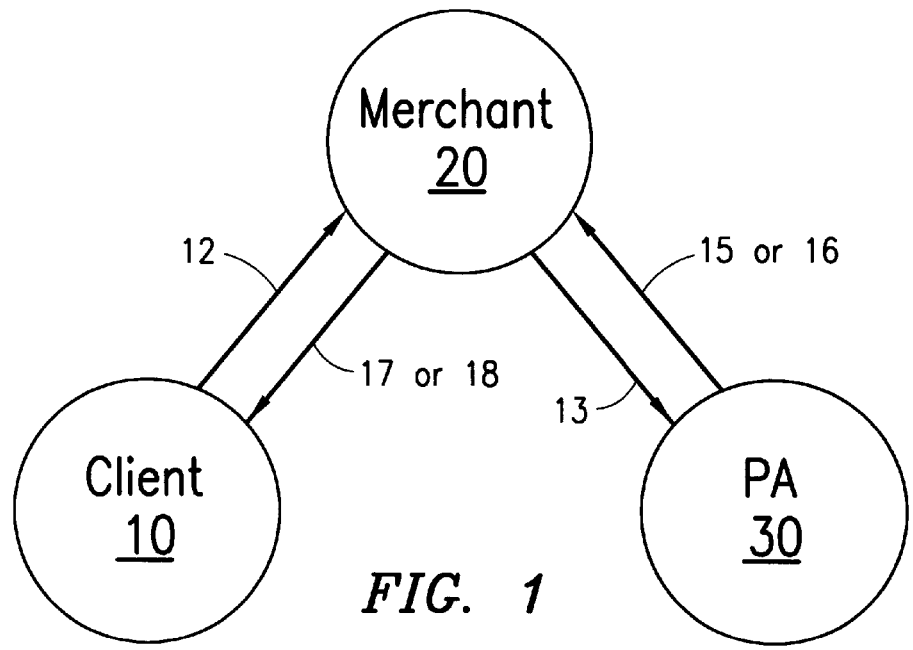
FIG. 1 is a diagram of a commercial transaction between a client, merchant and credit card authority.
Figure 3:
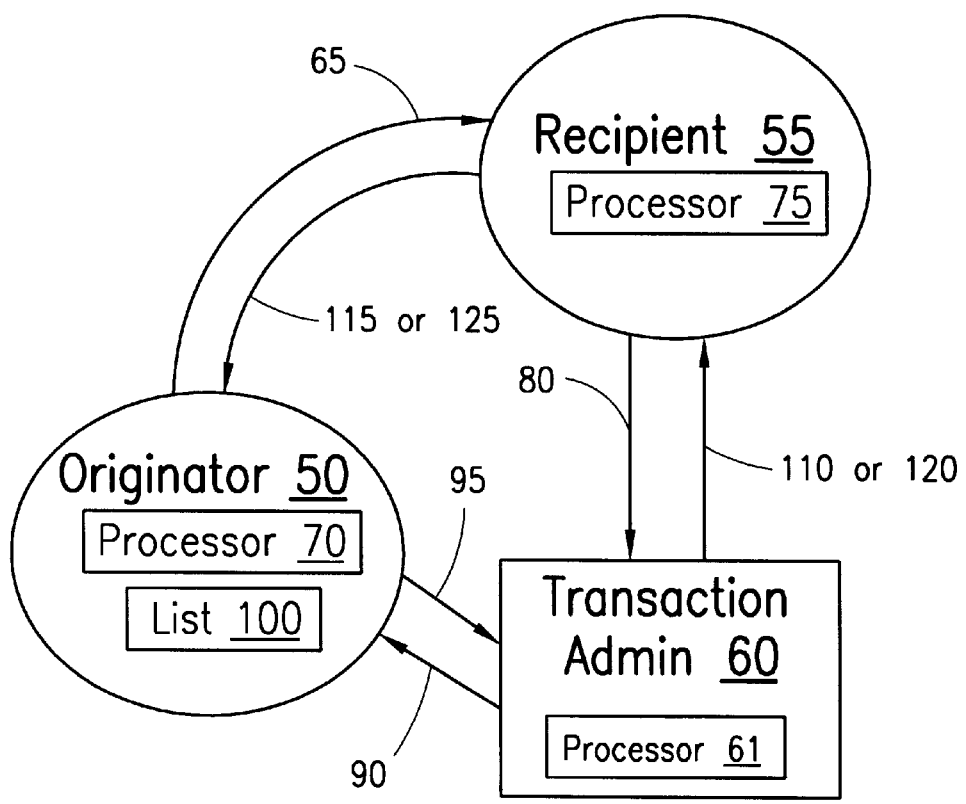
FIG. 3 is a diagram of a validated commercial transaction using the present invention between an originator, a recipient and a transaction administrator.
Figure 2:
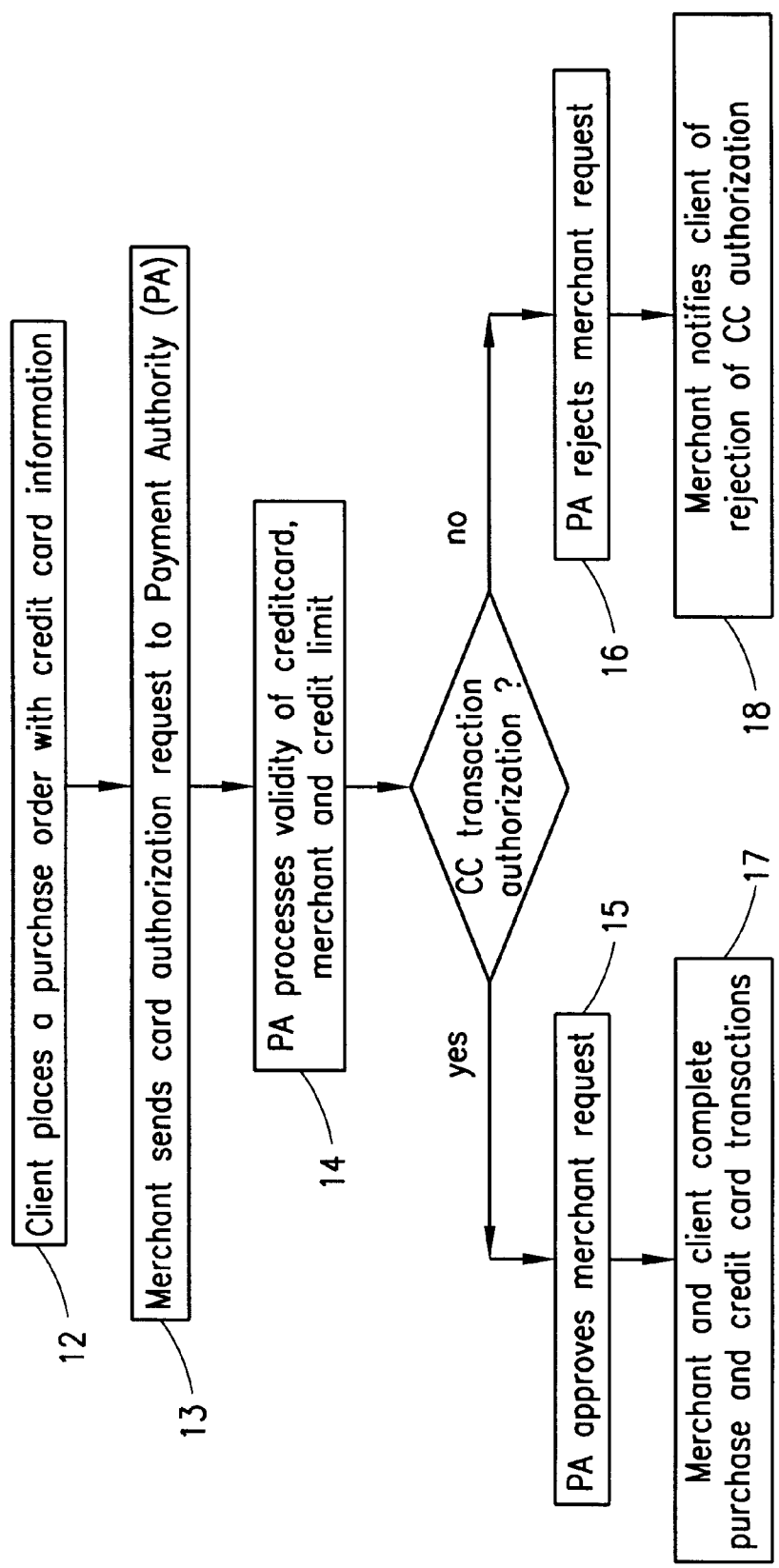
FIG. 2 is a flow diagram describing the transaction of FIG. 1.
Figure 4:
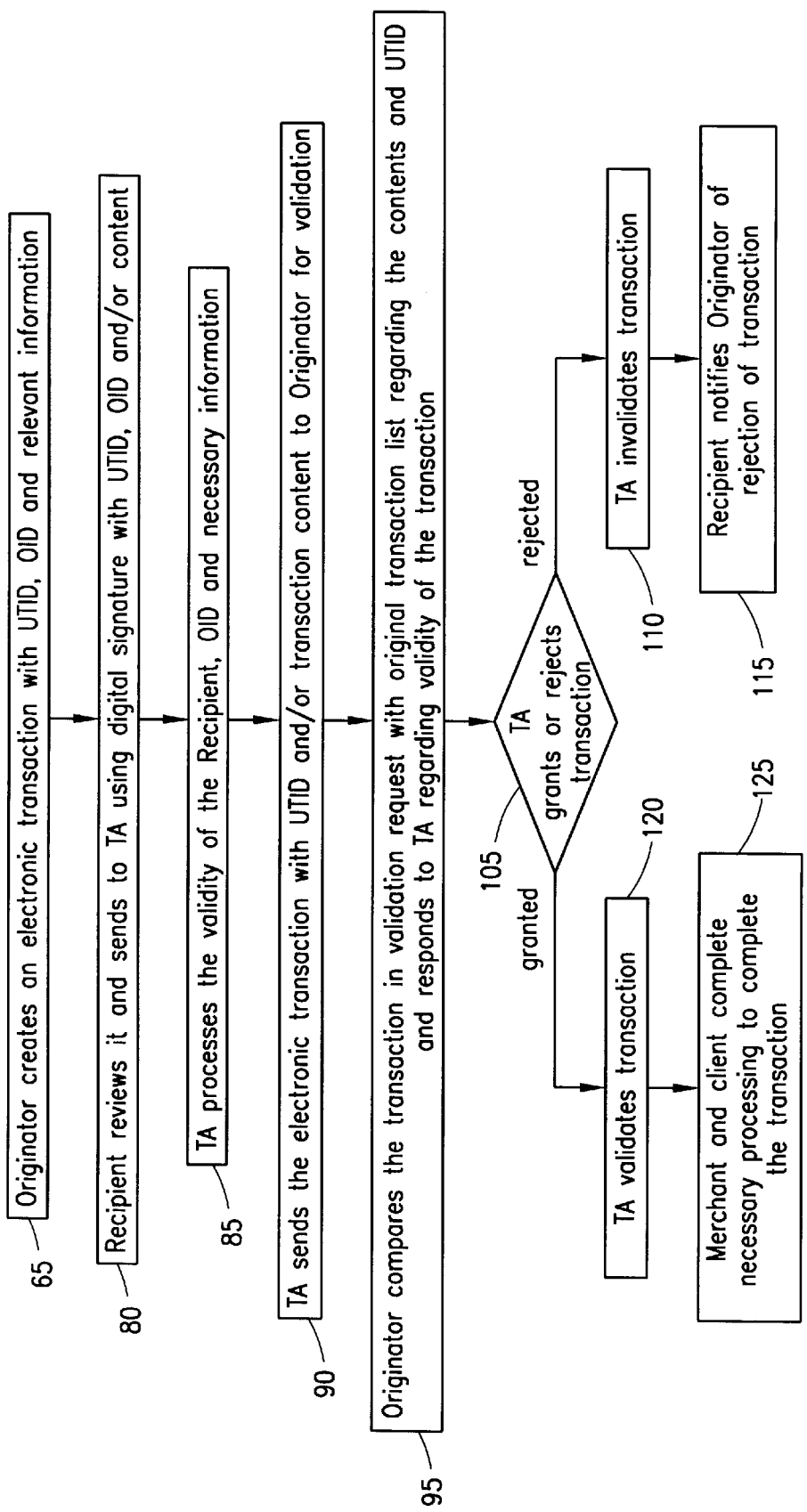
FIG. 4 is a flow diagram describing the transaction of FIG. 3.

Referring now to drawings and more particularly to FIGS. 3 and 4, there is illustrated a system and method for improved electronic transactions. An originator 50 initiates a transaction at step 65 using processor 70. The transaction may comprise a purchase, payment or request for an information document from recipient 55. The transaction request includes a unique transaction identifier (UTID) associated with the specific transaction request and originator identity (OID) to identify the originator 50 to a transaction administrator 60. The originator identity may comprise a credit card number, account number, etc.

The processor 70 referenced above is any suitable processor capable of handling transaction processing systems such as a personal computer (e.g. PC, Mac, Hand held PC), a point of sales (POS) device, a POS device with a Smart Card, a work station, a server or any other suitable hardware/software combination. The merchant 55 and TA 60 also include suitable processors at their facilities to run the electronic commerce transaction.

Recipient 55 first reviews the transaction request using a processor 75 and generates a request for authentication of the originator 50 using the OID, UTID and the information content of the transaction request such as an amount or document name at step 80 to the transaction administrator. The transaction administrator 60 first validates the identity of recipient 55 and then the OID at step 85. If the OID is invalid, the transaction administrator 60 notifies the recipient 55 of the invalidity and the transaction is denied. If the OID is valid, the transaction administrator 60 determines the originator associated with the OID, transmits the transaction request and associated data to the originator 50 and requests that the originator validate the transaction request containing the UTID at step 90. The transaction administrator 60 may also validate transaction amounts and credit limits at this time or upon receiving a response for the originator 50.

The originator 50 validates the transaction by comparing at step 95 the UTID with a list 100 generated by the processor 70 of the originator listing the UTID associated with each transaction generated by the originator and notifying the transaction administrator 60 of the results. The list 100 also includes the details of the transaction (amount; parties, etc.) associated with the UTID which must also be validated by the originator 50. The transaction is granted or rejected by the transaction administrator 60 based on the comparison results at step 105. If the originator 50 does not validate the transaction at step 95, the transaction administrator 60 rejects the transaction at step 110 which invalidates the transaction. The originator is notified at step 115 of the invalidation of the transaction. Upon receipt of the transaction validation status from the originator 50, the transaction administrator 60 validates the originator 50 and the transaction request at step 120, and notifies the recipient 55. The originator 50 and recipient 55 then complete the transaction at step 125.

Validation of the originator 50, recipient 55 and transaction administrator 60 may be validated by the use of digital signatures transmitted along with the various transmissions between parties in a known manner. Additionally, the identity of the originator 50 may be validated by requiring the originator to answer a series of questions that only the originator would know, such as mother's maiden name, social security number, etc. This configuration may be used to carry out a variety of different types of electronic commerce transactions. For example, if the originator 50 requests a document, the recipients 55 can send the document to the originator 50. An originator may also pay bills or purchase merchandise. There are several variations of this embodiment in which a transaction administrator 60, originator 50 and recipient 55 can initiate transactions and several, but not all, of these variations are illustrated in the following examples.

Figure 5:
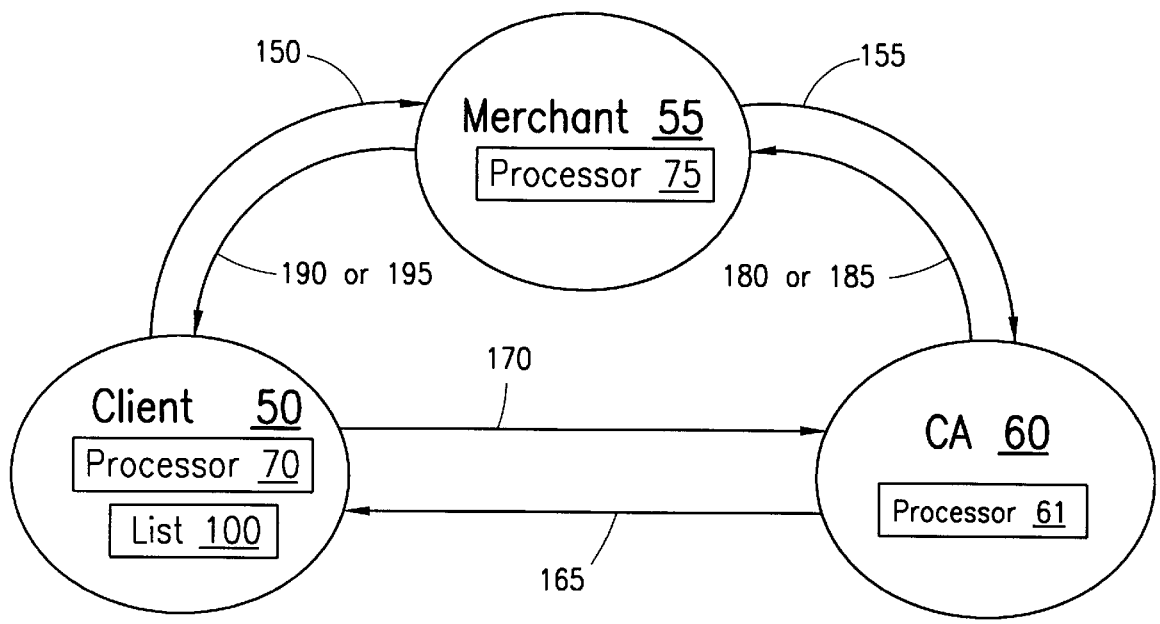
FIG. 5 is a diagram of an electronic commerce transaction using a credit card according to the method of the present invention.
Figure 6:
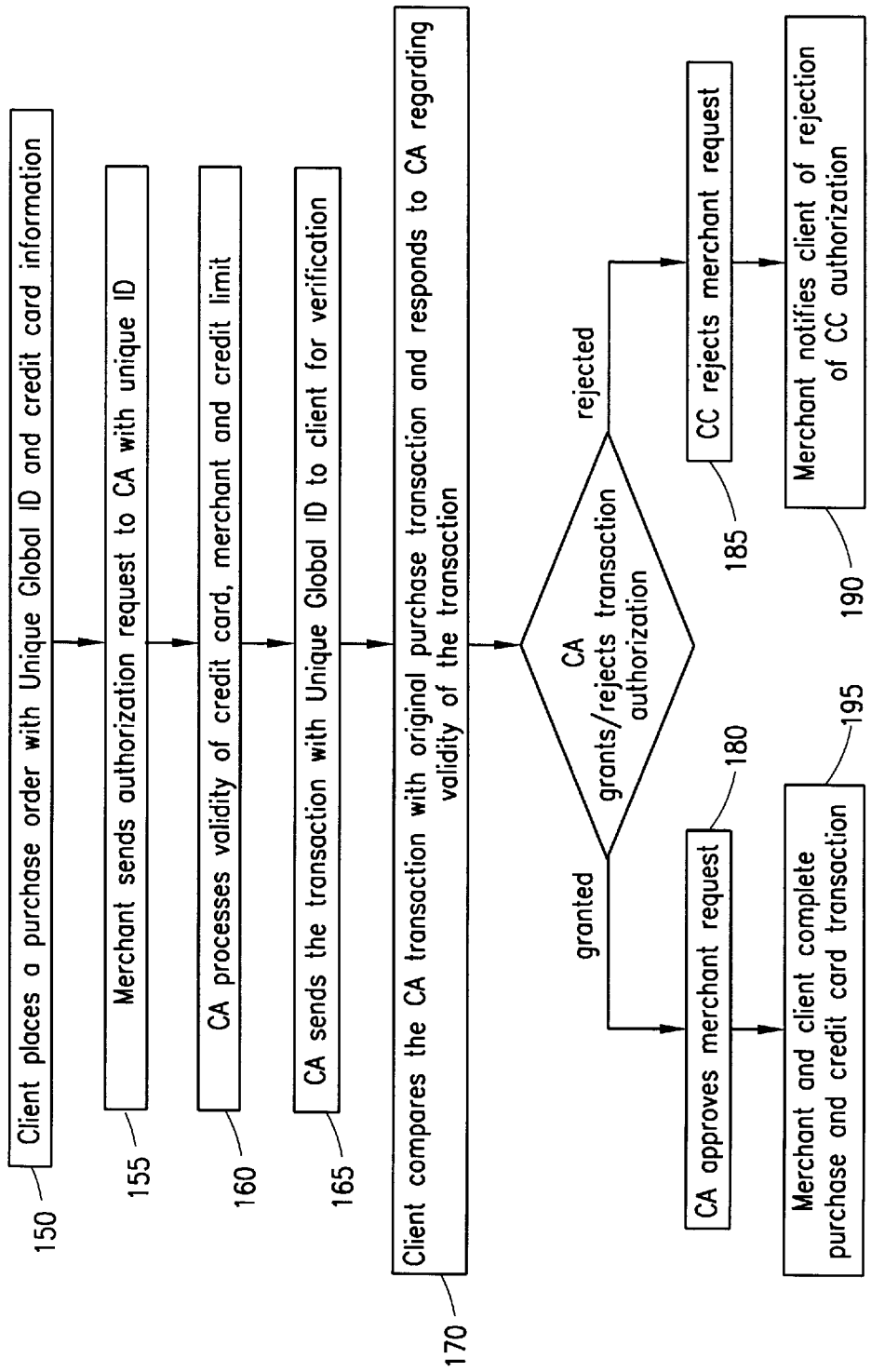
FIG. 6 is a flow diagram describing the transaction of FIG. 5.

For purposes of discussion, entities and components related to those disclosed in the embodiment described in FIGS. 3 and 4 will be given similar reference numbers in the remainder of the FIGURES. Referring now to FIGS. 5 and 6, these are illustrated diagrams for a particular embodiment of the invention for a credit card transaction between a client 50, merchant 55 and credit authority (CA) 60. A client 50 places a purchase order to the merchant 55 at step 150. The purchase order is generated by an electronic transaction processor 70 associated with the client 50. The purchase order includes a UTID 60 generated by the processor 70 that is uniquely associated with the transaction, an amount and a credit card number. Once the purchase order is received, the merchant 55 transmits at step 155 a request for payment authorization to the CA 60 over the Internet or a private network. Along with the confirmation request, the merchant 55 transmits the UTID, credit card number and data concerning the purchase order to the CA 60.

Upon receipt of the payment authorization request from the merchant 55, a CA processor 61 determines if the purchase order is authorized at step 100 by attending to the validity of the credit card number, merchant, amount of purchase, etc., and determine the client identity. The CA 60 transmits at step 165, the purchase order and the associated UTID 60 and purchase order data to the client processor 70. The UTID 60 and purchase order data are processed at the client 50 to determine if they are valid. The transmission from the CA 60 to the client 50 may be encoded using some type of virtual encryption key or any suitable encryption technology. The client processor 70 decodes the transmission (if encrypted) using knowledge of the virtual encryption key method between the client 50 and the CA 60 and compares the received unique transaction identifier to a unique transaction identifier list 100 of identifiers transmitted from the client at step 170 to determine whether to validate the transaction. The results of the validation is then forwarded to the CA 60. If the UTID 60 matches an entry within the client list 100 and the purchase order data checks out with what the client 50 expects, the requested transaction is identified as valid. If no match for the UTID is found or if the purchase order data is incorrect the requested transaction is identified as invalid or fraudulent.

As an additional protection, the CA 60 may query the client processor 70 for various items of information that only the client 50 would know, such as mother's maiden name, driver's license number, etc. This query may be constantly changed, such that an unauthorized user would not be able to predict what information the CA 60 might ask for. Additionally, digital signatures may be used to help identify parties.

The CA 60 responds at step 180, with an authorization for the transaction if the client 50 transaction and credit limit have been approved by the CA processor 61 and if there is a confirmation by client 10 of transaction validity. If the transaction is not validated by either the CA 60 or client 50, the CA transmits a rejection of the requested transaction to the merchant at step 185, and the client is notified by the merchant of the rejection at step 190. Upon confirmation of the purchase order, the merchandise may be delivered to the client 50 and a credit card transaction can be completed between client 50 and merchant 55 at step 195.

Communication between the client 50 and the CA 60 guarantees that an unauthorized purchase order is not issued by an unauthorized client or merchant 55 and that a merchant does not change the amount on the purchase order issued by the client. Furthermore, the delivery address may be confirmed by the client 50 prior to receipt of the goods. The use of the UTID in all communications between the client 50, merchant 55 and the CA 60, and the verification and validation of the purchase order by the client reduces fraudulent transactions. The system provides a mechanism for consumers to ensure the validity of transactions and thus enhances the overall security of electronic commerce. The UTID ties together all three delivery systems. The virtual keys used in communications between client 50 and the CA 60 not only prohibits unauthorized clients from performing a transaction but verifies that the current transaction has been initiated from the true client.

Figure 7:
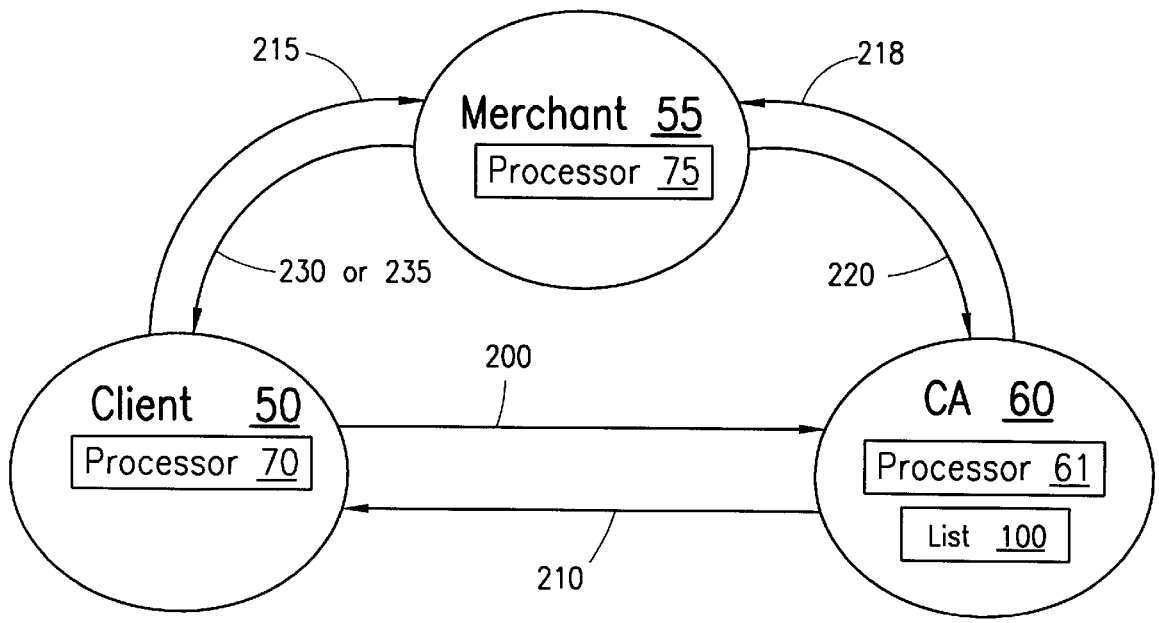
FIG. 7 is a diagram of an electronic commerce transaction according to an alternative embodiment of the method of the present invention.
Figure 8:
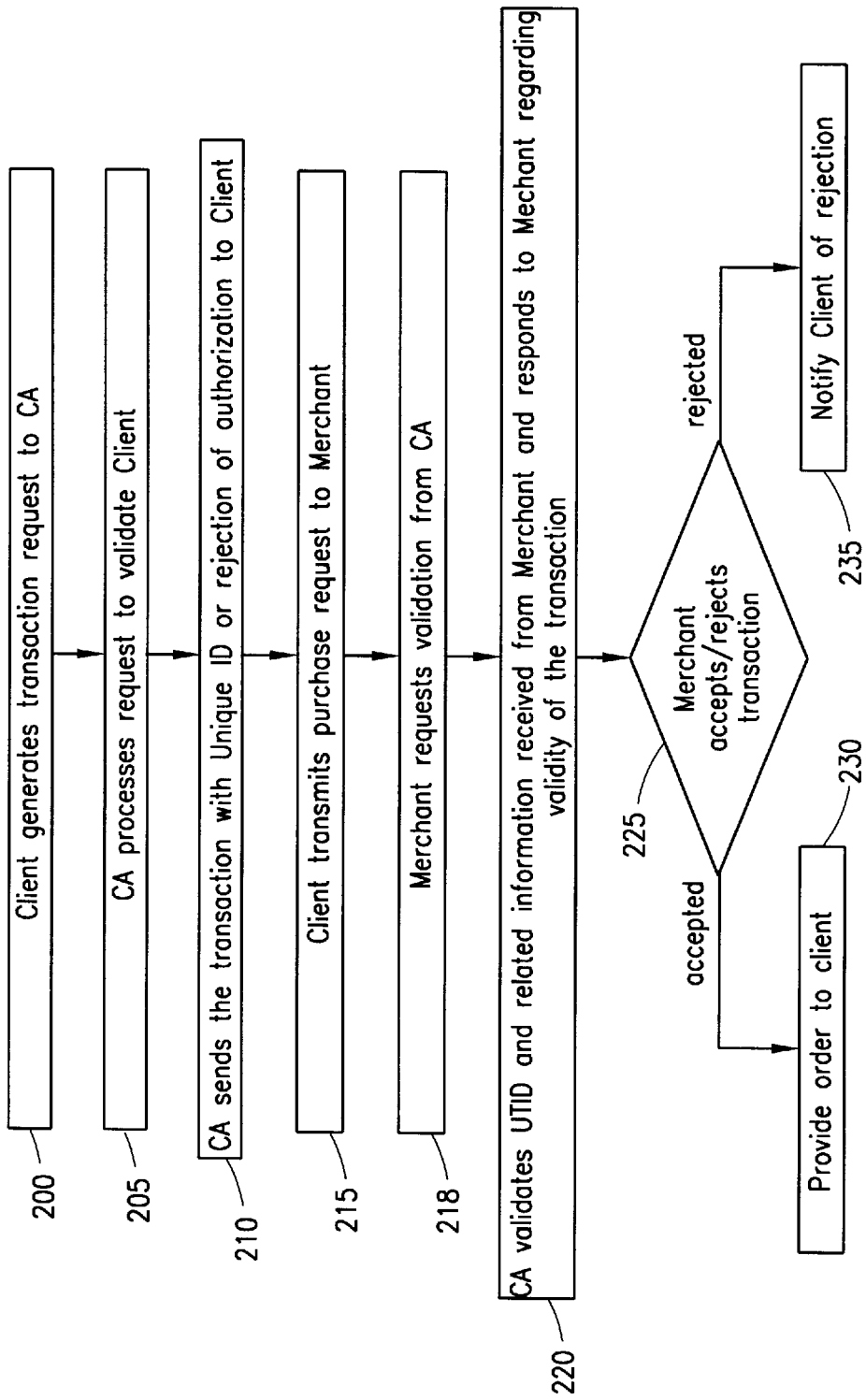
FIG. 8 is a flow diagram describing the transaction of FIG. 7.

In an alternative embodiment parties other than the originator 50 may create the UTID, for example the TA 60. A system and method for this type of transaction are illustrated in FIGS. 7 and 8. Initially, client 50 generates at processor 70, a credit authorization request including an originator identifier and relevant information to credit authority (CA) 60 at step 200. The CA 60 processes the credit request to determine the validity of the client 50 requesting credit based on the originator identifier and the associated amount at step 205. The CA 60 then sends the credit transaction information along with an associated UTID or a rejection of authorization back to client 50 at step 210. Upon receipt of credit approval and the UTID, the client 50, transmits a purchase request with the provided UTID to the merchant 55 at step 215. The merchant 55 sends a request for transaction validation of the UTID to the CA 60 at step 218. The CA 60 compares the transaction information, including UTID, with the original credit transaction and UTID in a list 100 of credit transactions and associated UTIDs generated by the CA and responds to the merchant 60 regarding the validity of the transaction at step 220. The comparison at the CA 60 uses a processor 61. The list 100 comprises credit transactions and associated UTIDs created by the processor 61. The merchant 55 accepts or rejects the transaction at step 225 based on the comparison performed at step 220 by the CA 60. If the merchant 55 accepts the transaction at step 225, the order is provided to the client 50 at step 230. If the merchant 55 rejects the transaction at step 225, it notifies the client 50 of the rejection at step 235. Each transaction is tracked by a corresponding UTID, and is verified by the CA 60 with reference to the originator 50 and the issuance of the UTID.

Figure 9:
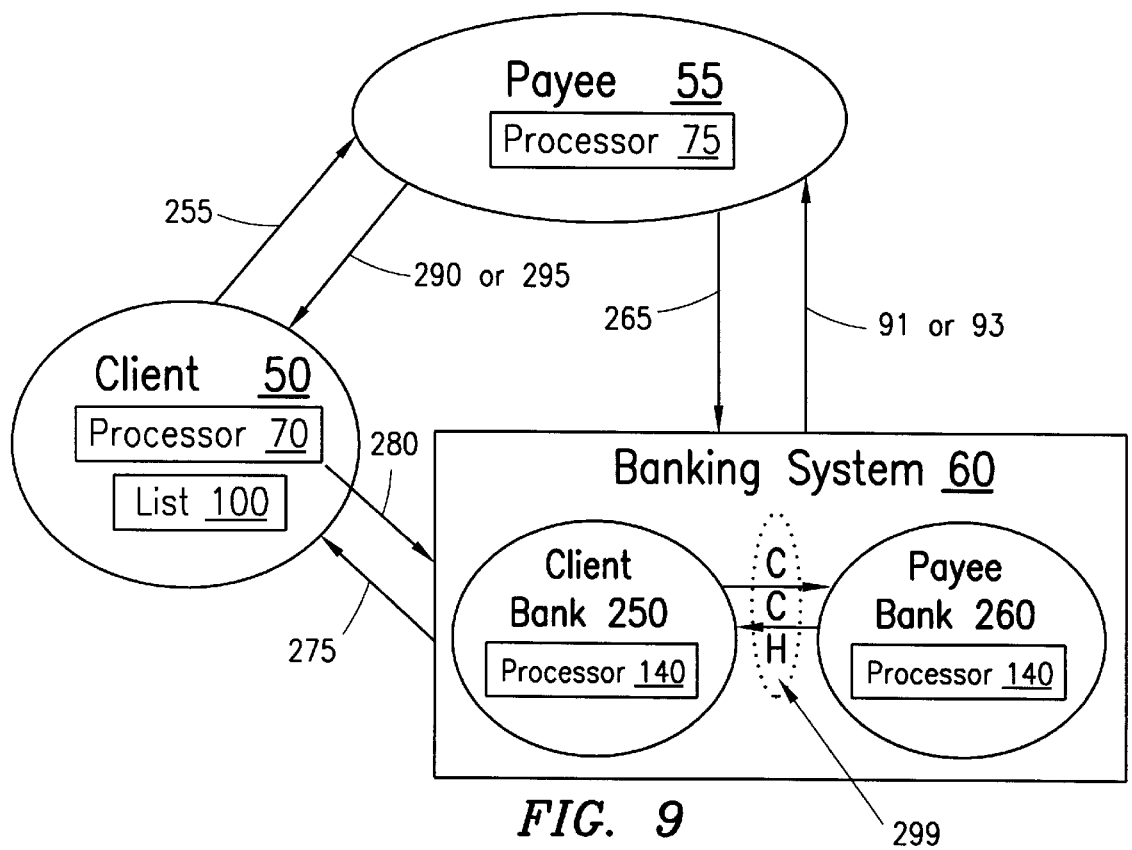
FIG. 9 is a diagram of an electronic commerce banking transaction to a payee for goods and services according to the method of the present invention.
Figure 10:
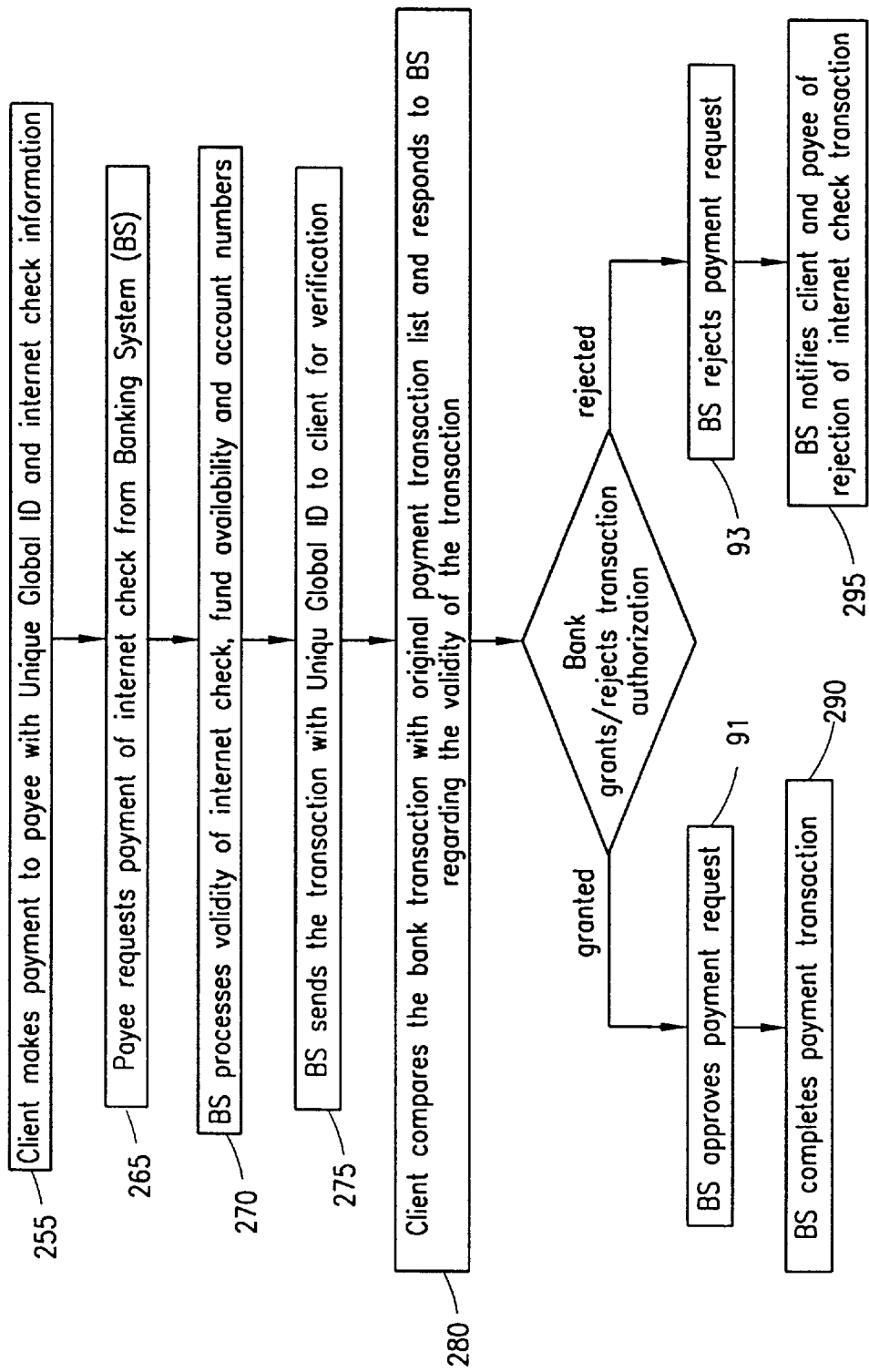
FIG. 10 is a flow diagram describing the transaction of FIG. 9.

FIGS. 9 and 10 illustrate another example of the proposed method and apparatus to enable validated banking transactions between an account holder or client 50 and any third party payee 55. This time a validation is performed between the client 50 and a client bank 250 in the banking system 60 to guarantee that a valid client 50 requested a payment transaction. Initially, a client 50 initiates a payment transaction to the payee 55 at step 255 in the form of, for example, an electronic check. The electronic check includes a UTID and associated electronic check information such as amount, account number, etc. In response to the electronic check, the payee 55 requests payment of the electronic check from the banking system 60 or deposits the electronic check into payee bank 260 at step 265. Upon receipt of the request or deposit, the payee bank 260 in conjunction with the client bank 250 in the banking system 60 determines the validity of the electronic check including bank number, fund availability, account number, etc. at step 270 and identifies the associated client or account holder 50 that initiated the transaction.

The banking system 60 then sends the electronic check along with the associated UTID to the client 50 for validation at step 275. The client 50 compares the information on the transaction with the original payment transactions and associated UTIDs and other relevant payment information at step 280 from a list 100. The list 100 will include all original electronic check transactions and the related information and UTIDs generated by the client 50. The client 50 then notifies the client bank 250 in the banking system 60 with a verdict on the validity of the transaction. Based on the validity determination provided by the client 50 and the client bank's 250 validity checks, the payee bank 260/banking system 60 grants or rejects the payment transaction at step 285. If the banking system 60 approves the payment transaction request at step 91, the payment transaction is then completed at step 290 by transferring funds to the proper accounts. If the transaction is rejected at step 93, the banking system 60 notifies the client 50 and the payee 55 of the rejection of the electronic check payment transaction at step 295.

Generally, the payee 55 deposits the electronic check in his/her account at payee bank 260 within the banking system 60. The payee bank 260 confirms the client's identity, account number and relevant information. The payee bank 260 next sends the electronic check for the payment to the client bank 250 of the client 50 via check clearing house (CCH) 299. Check clearing house 299 debits client's bank account and credits payee's bank account subject to client's bank validation of checks received from the payee 55. When the client's bank 250 receives an electronic check from the Check Clearing House 299 it validates the check (authenticates the check with the client 50 signature and available funds in the client's account). If the client's bank 250 does not validate the check, it rejects the check for the payment, and the check clearing house 299 reverses the transaction and notifies the payee bank 260. The payee's bank 260 then notifies the payee 55 that the check is "bounced" or returned back for insufficient amount or whatever else is the cause. All these processing steps may be performed in electronic transactions.

Figure 11:
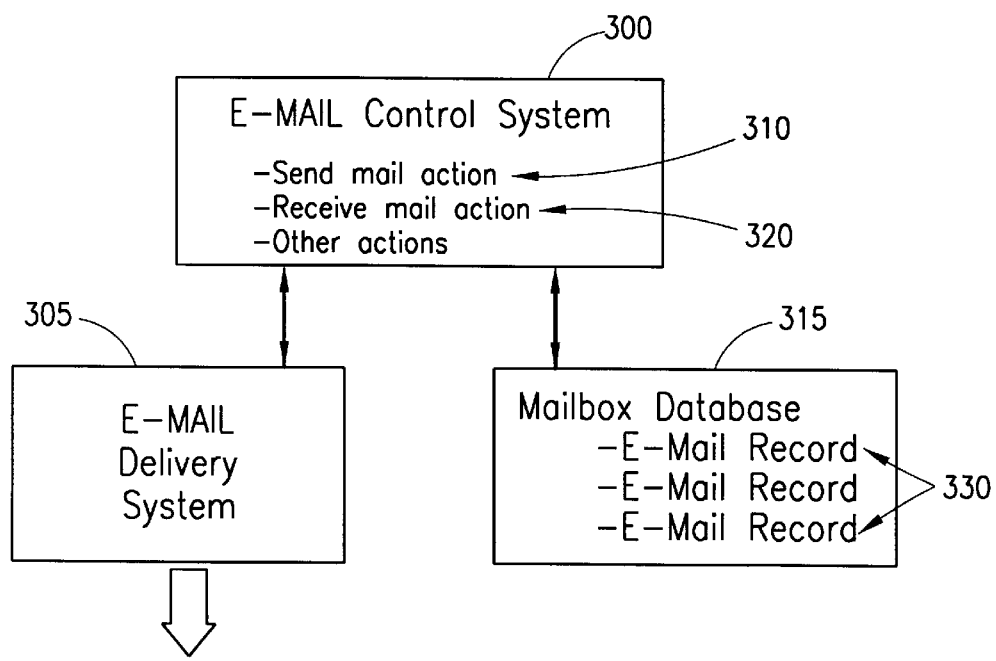
FIG. 11 is an illustration of an e-mail control system architecture enabling electronic commerce transactions according to the present invention.

The communications between the originator 50 and TA 60 or between the recipient 55 and the TA 60 can be established with any traceable delivery system, such as a point-to-point tunneling protocol (PPTP) which is equivalent to a telephone virtual circuit. However, an e-mail system also provides a traceable delivery system in an alternative embodiment an e-mail delivery system may be used not only to exchange information, but to process complex transactions and safely share information between multiple entities. Referring now to FIG. 11, there is illustrated an e-mail control system (ECS) 300 enabling electronic commerce transactions on the Internet between an originator 50, recipient 55, and transaction administrator 60. The system guarantees the validity of the electronic commerce transaction by validating that the client owning a presented credit card number, unique transaction identifier, transaction amount, etc., has initiated the transaction. There exists a traceable delivery system on computer networks such as the Internet, Intranet or private network, namely e-mail. An existing e-mail system may be extended so that an originator 50 can openly use payment numbers, such as credit card numbers and account numbers, over the Internet. The terms E-mail and e-mail are synonymous. In this example an ECS 300 interfaces with an e-mail delivery system 305 using the SMTP protocol to send mail and the POP3 protocol to receive mail. The ECS 300 enforces the new behavior of the e-mail delivery system 305 to perform transactions between the originator 50, the recipient 55 and the transaction administrator 60. The ECS 300 may be implemented in single or multiple processors wherein separate processors control transaction e-mails and normal e-mails.

The ECS 300 uses the e-mail delivery system 305 (or suitable applications or functions) in conjunction with a mailbox database 315 to create, reply to or view e-mail messages. The ECS 300 sends and receives e-mail messages to/from the e-mail delivery system 305 using send mail 310 and receive mail 320 actions/functions of the e-mail system. The ECS 300 includes information such as UTID, OID and transaction data within a transaction e-mail and enables extraction of this information at a receiving part for further transaction processing such as validation. The mailbox database 315 includes a plurality of e-mail records 330, each having a unique transaction identifier 331 (FIG. 12) associated therewith that has been generated by the e-mail control system 300.

A format of an e-mail record 330 is more fully described in FIG. 12 wherein there is shown an e-mail record 330 including the unique transaction identifier or message ID 331; a mail type identification 335 indicating whether the record is to be transmitted, was just received, has already been transmitted, or comprise a transaction e-mail; the recipient's address 340; the subject matter of the e-mail 345; and the contents of the e-mail 348. For simplicity, the mail type identification 335 identifies the state of the e-mail record as it relates to the state of the e-mail delivery system 305. For example, when a user creates an e-mail record, the ECS 300 deposits this e-mail record into the mailbox database 315 with mail "type" equal to 1 indicating that the e-mail record is ready to be delivered to the recipients. The recipient address 340, subject matter 345 and contents 348 provide routing and content information to the e-mail delivery system 305.

When e-mail messages are utilized to provide electronic commerce transactions various parts of the e-mail record 330 will have a specific format to enable identification of an electronic commerce transaction and extraction of relevant data from the e-mail record. For example, when an electronic check is used, the subject 345 of the e-mail message may be formatted to read in one of the following manners to enable recognition by the e-mail control system 300:

1. "CheckNumber"—identifies a transaction e-mail requesting an electronic commerce transaction by the originator to the recipient.
2. "Val:#CheckNumber"—identifies validation requests from the transaction administrator to the originator.
3. "Re:#CheckNumber"—identifies a reply from the transaction administrator to the recipient.
4. "ACK;#CheckNumber"—identifies positive validation from the originator.
5. "NACK;#CheckNumber[code]"—identifies a negative validation and a code indicating the reason for the negative validation from the originator.

In the case of an electronic check transaction, the mail contents 348 of the e-mail may comprise a number of items, depending on who the e-mail is from, and the data required to be extracted by the e-mail control system 300 of the receiving party. A transaction request from the originator 50 may include an account number, amount of the transaction, account reference, transaction reference, and originator's personal information. A response from a recipient 55 may include account number information, account references, transaction references, and recipient's personal information. An e-mail message from the transaction administrator 60 may contain query information for the originator to obtain validation.

There may be several variations of this mail content 348 information. For example, a party may use the message I.D. field of the e-mail services delivery system 305 to create a unique transaction identifier. This message I.D. field may act as a UTID and identify a transaction type. For example, a message I.D. type of the form #[TYPE][UNIQUE SEQUENCE NUMBER][ORIGINATOR E-MAIL ADDRESS] identifies the type of transaction, a unique sequence number generated by the e-mail control system 300 and the originator's e-mail address. In the case of a check transaction, the UTID would appear as follows:

c0000001originator@joe.doe
c0000002originatorat@joe.doe.

This information would notify the ECS 300 how a transaction was to be processed.

The subject field may contain a transaction data identifier, such as a purchase order number of the originator 50, and an invoice number of the recipient 55 such that the transaction can be related to a prior transaction or another message processing system processing the transaction data. For example, upon successful transfer of fund deposits from a transaction administrator, the recipient can use an invoice number to credit the originator's account.

As noted above, the ECS 300 sends and receives e-mail via send 310 and receive 320 mail actions defined within the e-mail system. When a user selects an action from the user interface (not shown), preferably by pointing and clicking on the icon identifying the action, the ECS 300 executes the action. A send mail action 310 sends all e-mail marked "Type 1" to the e-mail delivery system 305 via an SMTP interface and a receive mail action 320 receives all new mail from the e-mail delivery system 305 using a POP3 or similar interface. When the ECS 300 receives a new e-mail message, it loads the e-mail message into the mailbox database 315 as an e-mail record 330 and notifies the client 50. If the client 50 has any new mail and selects a "view new mail" action, the ECS 300 starts the "display mail" using a graphical user interface to display the new mail.

Figure 14:
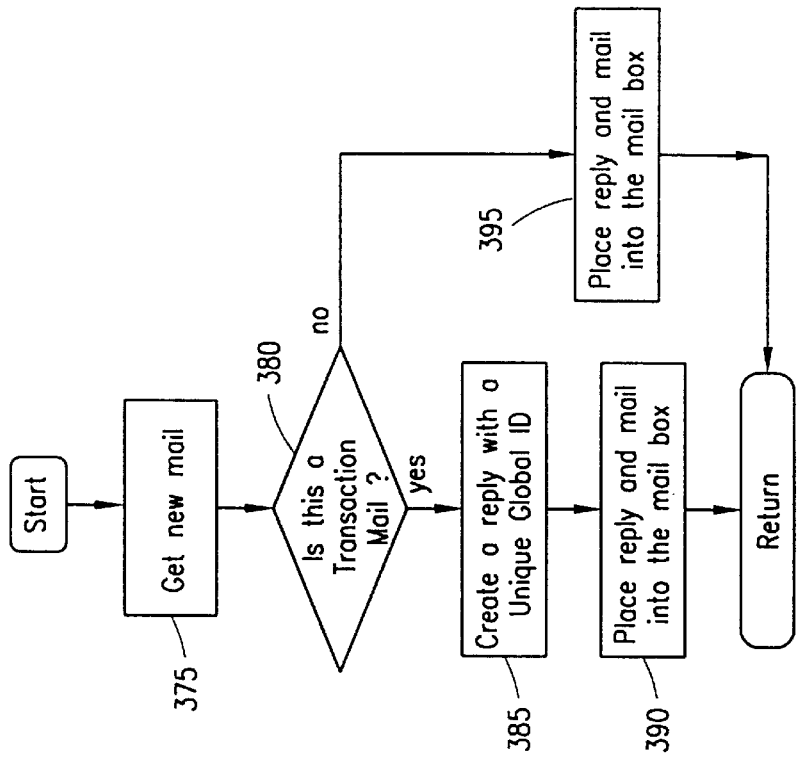
FIG. 14 is a flow diagram of a "receive" mail action of an electronic commerce transaction using an e-mail delivery system.
Figure 13:
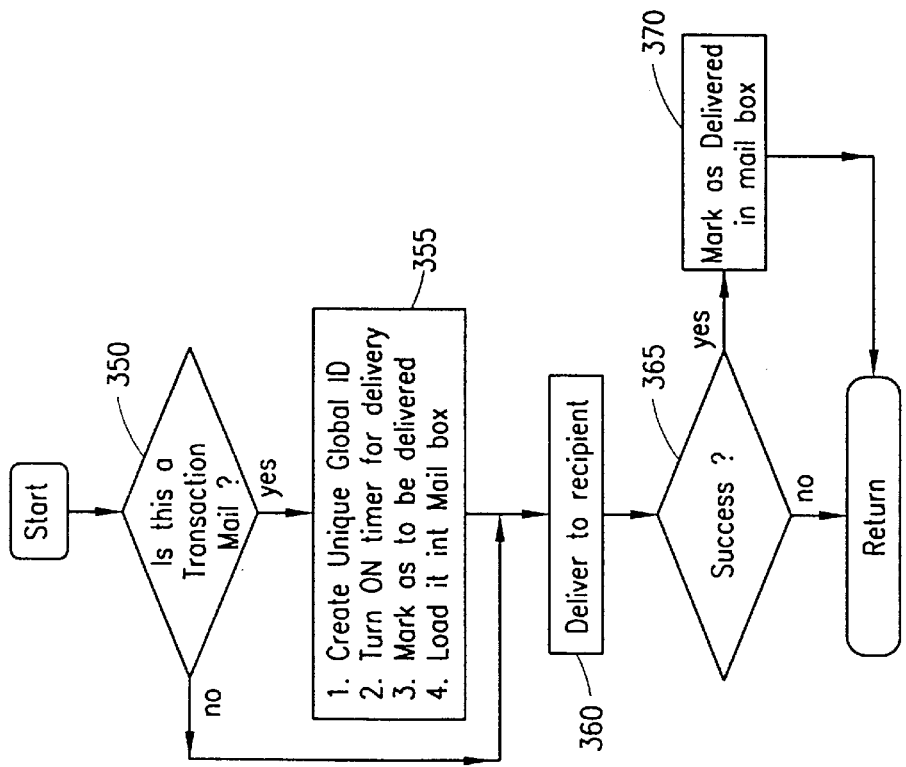
FIG. 13 is a flow diagram of a "send" mail action of an electronic commerce transaction using an e-mail delivery system.

FIGS. 13 and 14 describe the Send 310 and Receive 320 3-mail actions, respectively, of the e-mail control system 300 shown in FIG. 11. The send mail action 310 first checks if an e-mail record 330 contains a transaction at inquiry step 350. If a transaction is indicated, a series of tasks are performed at step 355. Initially a UTID is created. A delivery timer is initiated and the e-mail is marked for delivery. The e-mail record 330 is then loaded into the mail box database 315. The e-mail record is then ready for delivery to the recipient at step 360. Inquiry step 365 determines whether or not the delivery was a success. If so, the e-mail record is marked as delivered to the mail box database 315 at step 370 and the procedure is completed. Otherwise, no indication of delivery is provided.

The receive e-mail action 320 gets new e-mail from the e-mail delivery system 305 at step 375 and determines if the e-mail comprises transaction mail at step 380. If the e-mail comprises transaction mail, then the receive mail action 320 creates a proper reply with an attached UTID at step 385 and places the reply into the mail box database 315 for delivery at step 390. If the e-mail does not comprise transaction mail, the e-mail is placed directly in the mail box database 315 at step 395. These two actions allow the e-mail control system to properly process e-mail transactions to enable electronic commerce.

Figure 15:
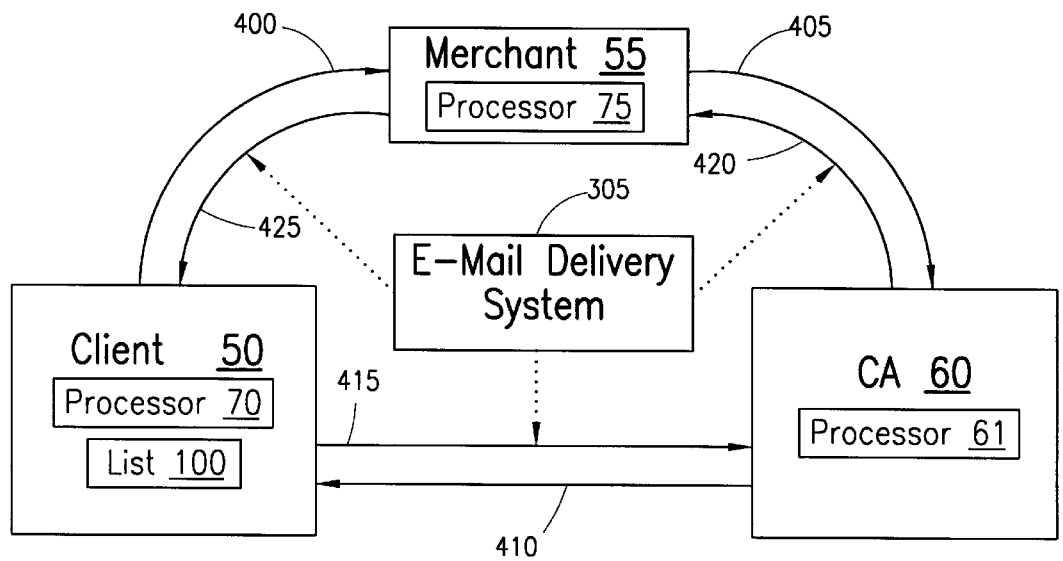
FIG. 15 is an illustration of an electronic transaction between an originator, recipient and transaction administrator using an e-mail delivery system.

Referring now also to FIG. 15, there is illustrated an application of the present invention whereby an electronic commerce transaction may occur between a client 50, a merchant 55 and a CA 60 utilizing an e-mail delivery system 305 to enable confirmation of the validity of the transaction. As discussed previously, the client 50 generates a purchase order which is formatted and transmitted to the merchant 55 via an e-mail message at 400. The ECS 300 causes the unique transaction identifier to be generated and attached to the e-mail message record 330 from the client 50 and formats transaction data within the message. The e-mail record 330 may be of the form of the records discussed previously. The merchant 55 receives and processes this e-mail message to extract relevant data and generates another e-mail message at 405 to the CA 60 requesting verification and authorization of the charge amount and the credit card number provided by the client 50. This e-mail message is also formatted by the ECS 300 to include the UTID and relevant transaction data initially transmitted by the client 50.

The CA 60 formats and generates yet another e-mail message which may be encoded using some type of virtual key encryption (or other type of encryption) for transmission to the client 50 at 410. Included within the e-mail message by the ECS 300 are the unique transaction identifier; purchase order data such as item, amount and delivery address; and optionally randomly generated questions on which only the client 50 has knowledge, such as birth date, mother's maiden name, social security number, etc. The client 50 utilizing its knowledge of the virtual key decrypts the e-mail message, extracts the relevant transaction data and compares the UTID provided in the e-mail message to the unique transaction identifier list 100 at the client 50 to determine whether or not the requested transaction has been initiated by the client.

If a match on the list 100 is found, the purchase order data is checked against the transaction data associated with the match. If the data matches, the client 50 generates an e-mail message to the CCA at 415 indicating that the requested transaction originated with the client (transaction valid) and provides responses to the random questions generated by the CA 60. This e-mail message could be encrypted if the client 50 so desires.

The CA 60, upon confirmation of the answer to the random questions and verification of the transaction by the client, transmits an e-mail message to the merchant 55 at 420 enabling delivery of the requested merchandise or services to the client at 425. If the transaction is not validated by either the client 50 or the credit authority 60 due to an improper UTID, improper query response or lack of authorization for the claimed credit limit amounts by the credit card authority, completion of the transaction is denied at 420 in an e-mail message.

Each of the e-mail messages transmitted by the e-mail delivery system 305 are responsive to queries to the e-mail control system 300 generated by a transaction request. The transaction request causes the e-mail control system 300 to generate the e-mail record 330 having the unique global transaction identifier or message identifier 331, a mail type identification 335 indicating a transaction, and the mail content 348, including all information necessary to perform the validation and authorization procedures at the credit authorities or transaction administrator and the transaction originating party.

Figure 16:
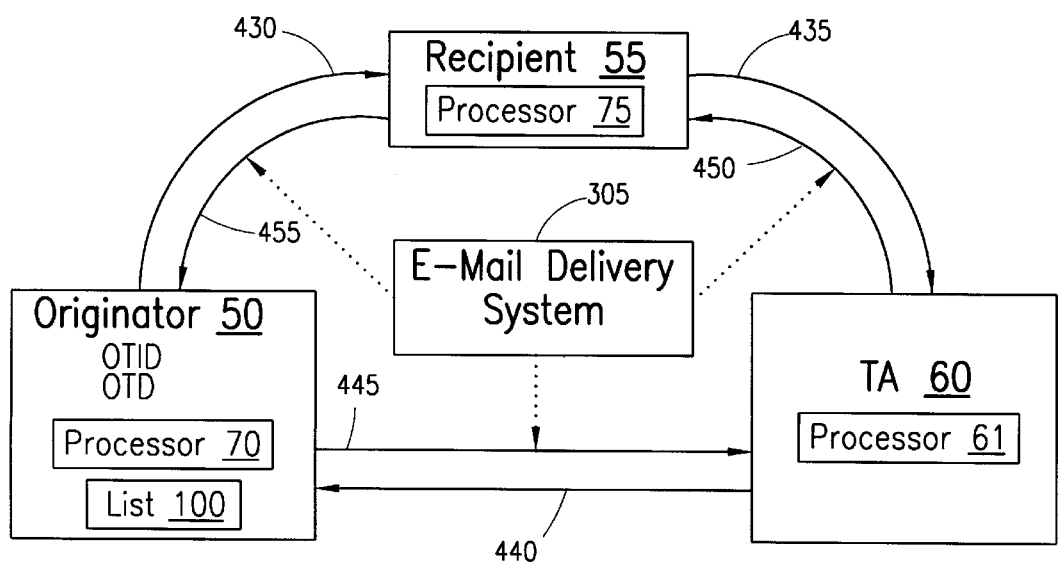
FIG. 16 is an illustration of an originator and a recipient exchanging information documents via an e-mail delivery system where the originator, the recipient and the information documents are validated directly by the transaction administrator.

Referring now to FIG. 16, there is illustrated an exchange of information between an originator 50 and a recipient 55 using an e-mail delivery system 305. Information is synonymous with document, software, classified data, transaction data or a database query and responses. The invention provides a method to securely exchange and process information between originator 50 and recipient 55, where an originator and recipient can be client or server on the Internet/Intranet or private network. Please note that currently, it is not possible to perform transaction processing between two clients on the Internet or Intranet. The present invention not only provides a method to perform transaction processing between two clients but also creates an automated secure information exchange firewall. While the following is described with respect to an e-mail delivery system it should be realized that any type of delivery system would be useful. The originator 50 sends a document including a UTID and originator identifier (OID) to recipient 55 within an e-mail message at 430. Upon receipt of the e-mail message, the recipient 55 forwards another e-mail message to the transaction administrator (TA) 60 at 435. The e-mail message includes the OID, UTID and document name. The TA 60 authenticates the OID of originator so a message can be transmitted to the originator. If OID does not authorize, the TA 60 sends a negative response to recipient 55 at 450. Otherwise, the TA 60 requests originator 50 to validate the transaction via another e-mail message at 440. The e-mail message includes the UTID.

The originator 50 validates transactions by comparing UTID with a list 100, including UTIDs generated by the originator along with associated information. The originator 50 sends a negative acknowledgment due to failure to match a UTID or associated information if the transaction is invalid or a positive acknowledgment if the transaction is valid and the UTID and associated information matches at 445. The TA 60 upon receipt of a positive or negative validation of the transaction with the associated UTID notifies the recipient of a positive status at 450.

The originator and the recipient then completes the information transaction at 455. For example, if recipient receives a positive acknowledgment for transaction, it accepts the information. Since the OID is authenticated by the TA 60, the recipient 55 is guaranteed that the information is received from the desired originator. In this example, since the originator 50 has validated the transaction and information, the originator is guaranteed that recipient 55 has received the information. The transaction administrator 60 may be any entity, such as a Government authority, U.S. Post Office, etc.

Following is an example, according to FIG. 16, of a client to client information exchange where the information comprises transaction data processing. In this example, an originator 50 sends an e-mail containing transaction data including SQL statements asking for database records from the recipient 55. Upon receiving an e-mail from the originator 50 recipient 55 sends an e-mail containing relevant data to the TA 60 to validate the transaction. The TA 60 validates the recipient 55 and originator 50. The TA 60 then sends a validation request via e-mail to the originator 50. The originator 50 validates the transaction by comparing UTID and transaction contents with the list 75 of transactions and responds to TA 60 regarding the validity of the transaction. TA 60 validates the transaction based on the response from the originator and notifies recipient 55 regarding the validity of the transaction.

If the transaction is valid, recipient processes the transaction data request using processor 75 (or another associated processor) and formats the data into an e-mail or sends the transaction data request to another processor (not shown) which processes the request and returns the transaction data into an e-mail for transmission to the originator 50. Requested information could be formatted into an ASCII document or an ASCII title with suitable delineation for data separation or into an Internet browser HTML document. When the originator 50 receives transaction data from the recipient 55, it then displays or processes the data.

Although preferred embodiments of the method and apparatus of the present invention have been illustrated in the accompanying Drawings and are described in the foregoing Detailed Description, it is understood that the invention is not limited to the embodiments disclosed, but is capable of numerous rearrangements, modifications, and substitutions without departing from the spirit of the invention as set forth and defined by the following claims.

What is claimed is:

1. A method for providing a validated electronic commerce transaction between an originator, a recipient and a transaction administrator, comprising the steps of:

generating an electronic commerce transaction including at least a unique transaction identifier associated therewith;

transmitting the electronic commerce transaction from the originator to the transaction administrator through the recipient;

transmitting the electronic commerce transaction from the transaction administrator to the originator for validation;

validating the electronic commerce transaction at the originator based on the unique transaction identifier;

notifying the transaction administrator of a validation status of the electronic commerce transaction based on the validation; and completing the electronic commerce transaction based on the validation status.

2. The method of claim 1 wherein the electronic commerce transaction further includes an originator identification associated with the originator and further including the step of authenticating the originator based on the originator identification.

3. The method of claim 2 wherein the step of transmitting further includes the step of transmitting the electronic commerce transaction to the authenticated originator.

4. The method of claim 2 further including the step of authenticating the originator based on the originator identification at the transaction administrator.

5. The method of claim 1 further including the steps of:
providing a recipient identifier; and
authenticating an identity of the recipient at the transaction administrator based on the recipient identifier.

6. The method of claim 1 wherein the step of completing further comprises the steps of:
transmitting the validation status to the recipient; and
completing the transaction with the originator based on the transmitted validation status.

7. The method of claim 1 wherein the electronic commerce transaction further includes an originator identifier and the step of validating further includes the step of validating the electronic commerce transaction at the transaction administrator based on the originator identifier.

8. The method of claim 7 wherein the originator identifier further includes a transaction data.

9. The method of claim 1 wherein the validation is further based on a transaction data.

10. The method of claim 1 where the electronic commerce transaction includes a plurality of transactions.

11. A method for providing a validated electronic commerce transactions between an originator, a recipient and a transaction administrator, comprising the steps of:

requesting an electronic commerce transaction from the originator to the recipient, the electronic commerce transaction including a unique transaction identifier, an originator identifier and transaction data;

requesting validation of the originator identifier and the transaction data from the transaction administrator;

requesting validation of the unique transaction identifier and the transaction data from the originator;

completing the electronic commerce transaction if the unique transaction identifier, the originator identifier and the translation data are validated by both the originator and the transaction administrator.

12. The method of claim 11 further including the step of validating the originator identifier and the transaction data at the transaction administrator.

13. The method of claim 11 further includes the step of validating the unique transaction identifier and the transaction data at the originator.

14. The method of claim 13 wherein the step of validating further comprises the step of comparing the unique transaction identifier and transaction data with a list including all unique transaction identifiers and associated transaction data at the originator.

15. A method for providing electronic commerce, comprising the steps of:

transmitting a payment transaction for items from an originator to a recipient, said request including at least an originator identifier;

transmitting a first verification request from the recipient to a transaction administrator to verify the originator identifier;

verifying the identifier for the originator at the transaction administrator;

transmitting a second verification request from the transaction administrator to the originator to determine if the originator generated the payment transaction;

verifying if the originator generated the payment transaction; and completing the payment transaction in response to answers on the first and the second verification requests.

16. The method of claim 15 wherein the step of completing further comprises the steps of:

transmitting from the originator to the transaction administrator, a response to the second verification request indicating if the originator generated the payment transaction transmitting from the transaction administrator to the recipient, a response to the first verification request verifying the identifier of the originator; and transferring the item to the originator.

17. The method of claim 15 further including the step of encrypting transmissions between the originator and the transaction administrator.

18. The method of claim 15 further including the steps of:
generating a unique identifier associated with the payment transaction and
attaching the unique identifier with the transaction order, the first verification request and the second verification request.

19. The method of claim 18 wherein the unique identifier further includes a transaction amount.

20. The method of claim 19 wherein the step of verifying further includes the step of comparing the unique identifier attached to the second verification request to a unique identifier list of the client to determine if the originator generated the request.

21. The method of claim 15 wherein the steps of transmitting further includes the step of transmitting via e-mail messages over a computer network.

22. The method of claim 15 further including the step of querying the originator from the transaction administrator with randomly generated questions relating to the originator.

23. The method of claim 15 wherein the identifier for the originator comprises an account number.

24. The method of claim 15 wherein the identifier for the originator comprises a credit card number.

25. The method of claim 15 wherein the electronic commerce transaction further includes an originator identifier and the step of validating further includes the step of validating the electronic commerce transaction at the transaction administrator based on the originator identifier.

26. The method of claim 25 wherein the originator identifier further includes transaction amount.

27. A method for providing electronic commerce, comprising the steps of:

transmitting a transaction for an item from an originator to a recipient, the purchase order including an originator identifier;

associating a unique transaction identifier with the transaction order;

transmitting a first verification request including the unique transaction identifier from the recipient to a transaction administrator to verify the originator identifier;

transmitting the unique transaction number from the transaction administrator to the originator;

comparing the unique transaction identifier to other unique transaction identifiers generated by the originator to determine if the originator generated the unique transaction identifier; and completing the transaction if the originator generated the unique transaction identifier.

28. The method of claim 27 wherein the step of completing further comprises:

notifying the transaction administrator if the originator generated the unique transaction number based on the results of the comparison;

generating a response to the first verification request from the transaction administrator to the recipient, the response indicating if the originator identifier is valid; and transferring the item to the originator.

29. The method of claim 27 wherein the steps of transmitting further includes the step of transmitting via e-mail messages over a computer network.

30. The method of claim 27 wherein the electronic commerce transaction further includes an originator identifier and the step of validating further includes the step of validating the electronic commerce transaction at the transaction administrator based on the originator identifier.

31. A method for providing electronic commerce transactions over a computer network between an interconnected originator, recipient, and a transaction administrator, comprising the steps of:

generating a first e-mail message from the originator to the recipient containing a transaction order for an item, the transaction order containing a unique transaction identifier, an originator identifier and transaction data;

generating in response to the first e-mail message a second e-mail message from the recipient to the transaction administrator requesting validation of the originator identifier, the second e-mail message including the unique transaction identifier and the originator identifier;

generating in response to the second e-mail message a third e-mail message from the transaction administrator to the originator requesting validation of the unique transaction identifier, the third e-mail message including the unique transaction identifier;

comparing the unique transaction number from the third e-mail message to other unique transaction numbers generated by the originator to determine if the originator generated the transaction order; and completing the transaction order based upon the results of the comparison.

32. The method of claim 31 wherein the step of completing further comprises the steps of:

notifying the transaction administrator if the originator generated the unique transaction number based on the results of the comparison;

generating a response to the authorization request from the transaction administrator to the recipient, the response indicating if the originator is valid; and transferring the item to the originator.

33. The method of claim 32 further including the step of encrypting transmissions between the originator and the transaction administrator.

34. The method of claim 32 further including the step of querying the originator from the transaction administrator with randomly generated questions relating to the originator.

35. The method of claim 31 further including the step of extracting the unique transaction identifier from the third e-mail message prior to the comparison.

36. The method of claim 31 further including the step of extracting the originator identifier from the second e-mail message.

37. The method of claim 31 wherein the unique transaction identifier further includes the transaction data.

38. The method of claim 31 wherein the originator identifier further includes the transaction data.

39. A system for providing secure electronic commerce transactions between an originator, a recipient and a transaction administrator, comprising:

first processing means associated with the originator for generating an electronic commerce transaction having a unique transaction identifier and an originator identifier, associated therewith;

second processing means associated with the recipient responsive electronic commerce transaction from the originator for generating validation requests on the originator identifier to the transaction administrator;

third processing means associated with the transaction administrator for forwarding the unique transaction identifier to the originator to determine the validity of the electronic commerce transaction and fourth processing means for comparing a unique transaction identifier received from the transaction administration to the unique transaction identifier generated by the second processing means to determine the validity of the transaction order.

40. The system of claim 39 further including a delivery system interconnecting the originator, the recipient, and the transaction administrator to enable transmission of information therebetween.

41. The system of claim 40 wherein the delivery system comprises a computer network.

42. The system of claim 41 wherein the computer network comprises the Internet.

43. The system of claim 41 further including an e-mail delivery system to enable communications between the originator, the recipient and the transaction administrator.

44. The system of claim 39, further including means for encrypting transmissions between the purchaser and the transaction administrator.

45. The system of claim 39 wherein the means associated with the transaction administrator further includes means for generating random queries to the purchasers, said queries only concerning questions of which the purchaser has knowledge.

46. The system of claim 39 wherein the means for generating transaction orders and the means for comparing are incorporated within at least one processor to automatically perform processes associated with the transaction order.

47. The system of claim 39 wherein the third processing means further validates the originator identifier responsive to the request from the second processing means.

48. The system of claim 42 wherein the origination identifier further includes transaction information.

49. The system of claim 39 wherein the transaction identifier further includes transaction data.

50. A method for enabling electronic commerce transactions between a first party, a second party and a transaction administrator, comprising the steps of:

generating a request for processing of an electronic commerce transaction;

associating a unique transaction identifier with the electronic commerce transaction, the unique transaction identifier indicating a valid transaction;

determining the validity of the electronic commerce transaction by comparison of the unique transaction identifier with a list of valid unique transaction identifiers; and completing the electronic commerce transaction based upon the results of the determination of the validity of the unique transaction identifier.

51. The method of claim 50 further including the steps of:

associating an originator identifier with the electronic commerce transaction; and validating an identity of the originator based on the originator identifier at the transaction administrator.

52. The method of claim 51 further including the step of validating transaction data at the transaction administrator.

* * * * *